United States Patent [19]
Starr

[11] 3,762,507
[45] Oct. 2, 1973

[54] SHOCK ABSORBING SAFETY LINE

[76] Inventor: John H. Starr, 733 South Columbus St., Alexandria, Va. 22314

[22] Filed: May 20, 1971

[21] Appl. No.: 145,189

[52] U.S. Cl. .................................. 188/65.1, 182/4
[51] Int. Cl. ....................... B65h 59/16, A62b 1/16
[58] Field of Search .................. 182/3, 4, 5, 6, 7, 182/48; 188/1 C, 65.1; 244/137

[56] References Cited
UNITED STATES PATENTS

| | | | |
|---|---|---|---|
| 3,181,821 | 5/1965 | Eddins | 188/1 C |
| 2,407,634 | 9/1946 | DuPont | 188/1 C |
| 2,412,895 | 12/1946 | Lewis | 182/3 |
| 3,580,358 | 5/1971 | Yamamoto | 182/48 |

Primary Examiner—Reinaldo P. Machado
Attorney—Dennison, Dennison, Townshend & Meserole

[57] ABSTRACT

A flexible tube of individual strands woven in the manner of the well known "Chinese finger grip" has therein a collet in tight frictional engagement with the casing wall. The casing and collet constitute a frictional drag type shock absorber for inclusion in a safety line. One end of the casing has means for attachment to an immovable anchor. A cable permanently connected to the collet passes out through the other end of the casing. The free end of the cable has means for attachment to a window cleaner's belt.

5 Claims, 6 Drawing Figures

PATENTED OCT 2 1973 3,762,507
SHEET 1 OF 2
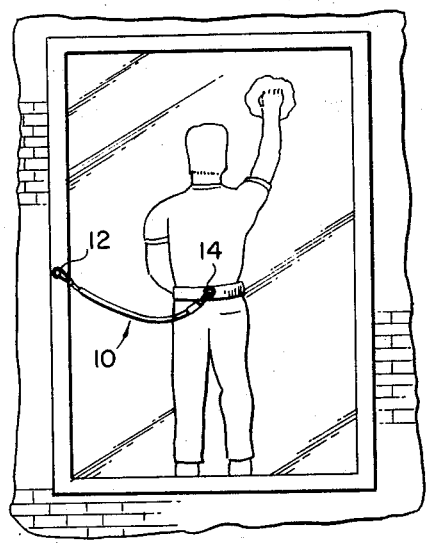
Fig. 1
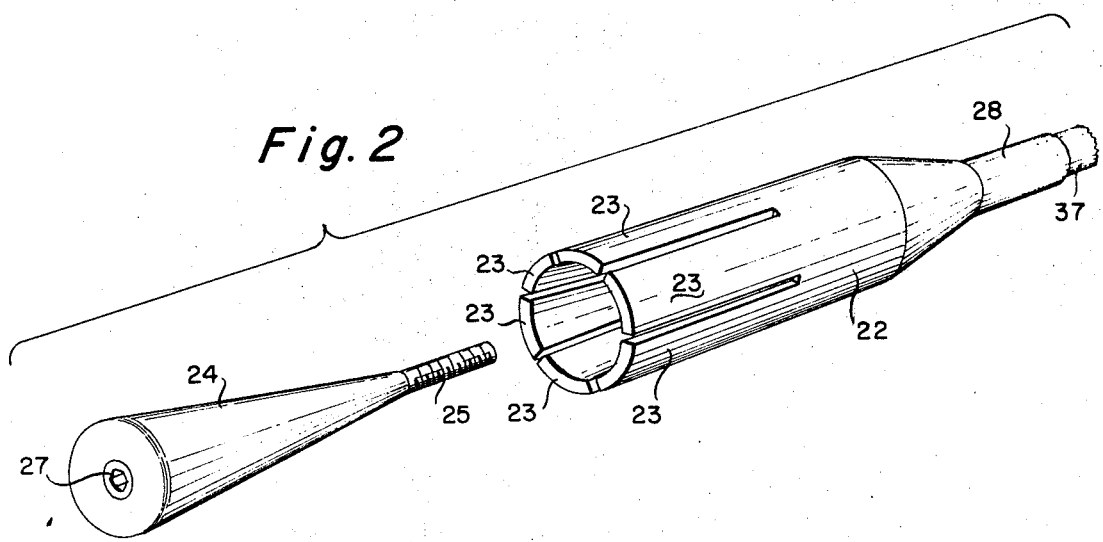
Fig. 2
Fig. 3
INVENTOR
John H. Starr
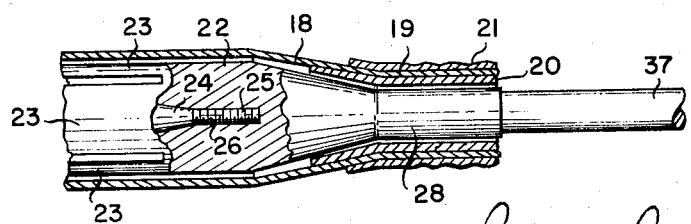
ATTORNEYS

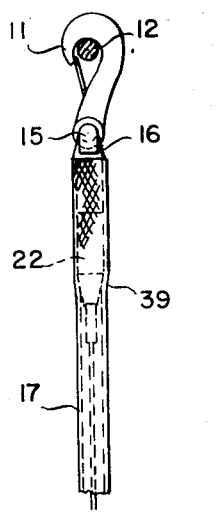
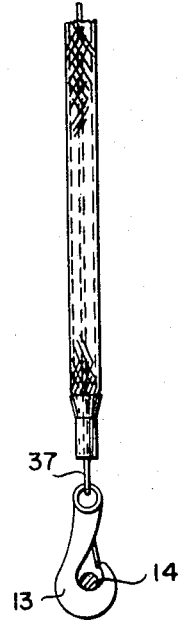
Fig. 4
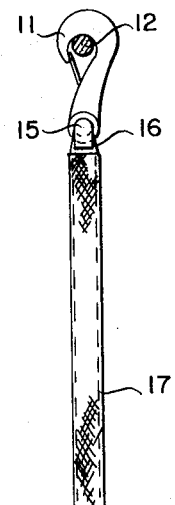
Fig. 5
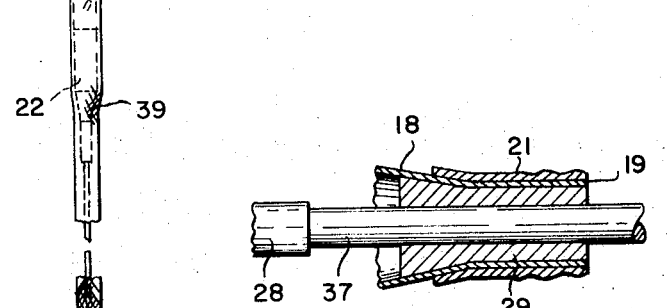
Fig. 6
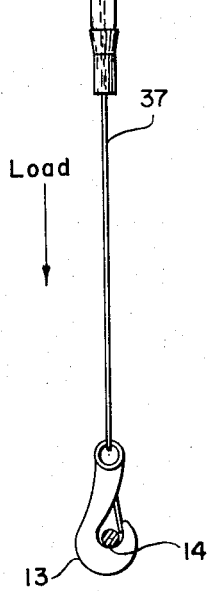

3,762,507

SHOCK ABSORBING SAFETY LINE

BACKGROUND

1. Field of the Invention

The present invention relates in general to the art of shock absorbers, and in particular to shock absorbers that are components of safety lines used by window cleaners, steeple jacks, and workers in high places to prevent injury from a fall.

2. Prior Art

The teaching of the prior art is principally concerned with shock absorbers in which the kinetic energy generated by the sudden application of a live load is gradually dissipated by the use of tensioning spring means, hydraulic or pneumatic shock cushioning devices, and shock absorbing devices of various types in which pressure generated by the imposition of an applied load is gradually relieved through the drag of friction between the wall of a casing and a body moving therein under force applied by the load. The only prior art shock absorbers which, in my opinion, may be germane to my invention are those of a class typified by U.S. Pat. No. 3,026,972 to Hendry et al., in which shock is absorbed and gradually cushioned by distortion of the metal wall of a cylindrical casing so that it is deformed from circular cross section to a substantially square cross section by means of a mandrel moving axially within the casing in tight frictional engagement with its wall under a force applied by the sudden imposition of a live load generated by a moving body that is to be stopped by progressive deceleration of its velocity.

SUMMARY OF THE INVENTION

The present invention is basically a flexible connector having at one end means for attachment to a fixed, stationary support, such as a window frame, and having at its other end means for attachment to a movable member, such as for example, the safety belt of a workman. The connector includes shock absorbing means operative automatically upon fortuitous movement of the movable member to prevent movement of the member beyond a predetermined distance and simultaneously to decelerate progressively without sudden shock the velocity at which the member moves.

The specific embodiment of the invention disclosed is a safety line for window cleaners. It includes shock absorbing means operative automatically upon the imposition of a live load, such as the weight of a falling person, to cushion a fall by progressively decreasing the velocity of the falling body and slowing it to a halt at or before a predetermined distance limit of fall. The deceleration is effected through frictional drag of an expanded collet sliding axially within a flexible tubular casing with the collet fingers in tight frictional engagement with the casing wall. One end of the casing is secured to a hook for attachment to an anchor on a window frame. A flexible cable passed through the other end of the casing is permanently secured to the collet. The free end of the cable is secured to a hook for detachable connection to a conventional safety belt.

The tubular casing and the collet constitute a shock absorber that is included as a component of the line. The casing is a fabric of individual strands woven in such manner that, when one end of the casing is anchored and the remainder is subjected to an axial pulling force directed away from its point of anchorage, the casing will stretch axially and at the same time will decrease in diameter. Axial movement of the collet under pull of the cable correspondingly pulls the woven casing so that it stretches and simultaneously constricts on the collet to add a compression force directed radially inward against the collet, which progressively amplifies the frictional drag of the collet as it is pulled through the casing under the force of the load applied to the cable.

DESCRIPTION OF THE DRAWINGS

FIG. 1 is a side elevation of my safety line shock absorber in use.

FIG. 2 is an exploded perspective view of a collet and its expander constituting components of my invention.

FIG. 3 is a fragmentary sectional view illustrating structural details of the assembly at the stop end of the shock absorber.

FIG. 4 is a side elevation of the safety line with the parts in their initial inactive positions.

FIG. 5 is a view similar to FIG. 4, but illustrating their relative positions when the safety line is activated.

FIG. 6 is a fragmentary sectional view illustrating details of a modification of the stop end assembly of FIG. 3.

DETAILED DESCRIPTION

A preferred embodiment of the present invention is disclosed herein as a window cleaners' shock absorbing safety line 10 having at one end a snap hook 11 for attachment to a fixed window frame support 12 and at its other end a similar hook 13 for attachment to a conventional safety belt 14 worn by a window cleaner as shown in FIG. 1. In broad terms of the invention, the window frame support 12 is a fixed support and the belt 14 is a freely movable member, and the safety line 10 is a flexible connector having at each end means for attachment to the support and member.

The shank of the window hook 11 is preferably secured by means of a rivet 15 to one end portion 16 of a flexible cylindrical tube 17 that is an element of the flexible safety line 10. Optionally, the rivet 15 may provide a pivotal connection between the hook 11 and the adjacent end of the flexible tube.

A salient feature of the present invention is the fact that the flexible tube 17 has the inherent property of diametric constriction under the proportionate to axial elongation thereof. In the specific embodiment of the invention herein disclosed, the wall of the tube consists of equal length strands of nylon, steel wire, polyester cord, or any suitable material woven in a "basket-weave" body in which the strands are inclined with respect to the longitudinal axis of the tube; such as, for example, the weave of the well known "Chinese finger grip" amusement device which progressively decreases in diameter during axial elongation and increases in diameter during axial compression. As best seen in FIG. 3, the end portion of the tube adjacent the movable support attachment hook 13 is constricted in a frusto-conical portion 18 that terminates in a cylindrical extension 19 of reduced diameter relative to the diameter of the remainder of the tube. The extension 19 is securely clamped between an inner metal sleeve 20 and an outer metal sleeve 21, preferably by crimping or swaging the assembly.

The above described constricted end assembly of the tube and sleeves provides a stop seat for a metal collet member 22 encased within the tube 17 in axially slidable frictional contact therewith. This collet member 22 is cylindrical and complemental to the interior configuration of the tube 17 within which it is capable of axial movement under an applied force of sufficient magnitude to overcome the frictional engagement of the collet fingers 23 against the interior face of the tube. The collet fingers are arcuate in cross section and together circumscribe a tapered socket open at the inner end of the collet for reception of an expander 24. The body of collet expander 24 is shaped as a cone having at its base a diameter greater than the diameter of the circle defined by the arcuate inner faces of the fingers 23 prior to expansion. The apex portion of the expander cone is formed with an integral axial extension constituted as a stem 25, screw threaded for engagement in a threaded socket 26 disposed in the body of the collet member on the axis thereof. The inner end of the expander 24 is provided with tool engageable means 27, here shown as an Allen wrench socket fitting, by which the expander 24 may be rotated on its axis to engage the collet fingers for selective radial expansion thereof. The degree of expansion of the collet fingers is selectively determined by the axial extent and direction of travel of the expander stem 25 in its socket 26; in consequence, the degree of expansion of the collet fingers, which have inherent resilience, determines the magnitude of their frictional engagement with the casing tube 17.

The safety line of the present invention further includes a flexible cable or rope 37 which at one end is permanently connected to the reduced outer end portion 28 of the collet member 22 and which at its other end is permanently connected to the movable support attachment hook 13. The maximum length to which the safety line 10 can be extended in service is determined by the extent of axial travel of the collet member 22 caused by imposition of a load on the hook 13 and cable 37. In the preferred embodiment of the invention as shown in FIG. 3, the connection between the end of cable 37 and the outer end of the collet is effected by inserting the cable end in an axial bore (not shown) in the reduced end portion 28 of the collet and swaging the collet end on the cable housed therein.

An alternative manner of constructing the stop seat end assembly of the tube is illustrated in FIG. 6 in which the cable end is slidable through an axial bore in a plug 29 which is secured in the reduced end 19 of the tube. The cable 27 and plug 29 are in tight frictional engagement, whereby to add a further drag to resist pull on the cable.

In the initially assembled organization of the safety line 10 its component parts occupy the respective positions as shown in FIG. 4, with the collet assembly closely adjacent the hook 11 to which the adjacent end of the casing tube 17 is permanently anchored. In this inactive position of the parts the collet fingers 23 are expanded into tight frictional engagement against the wall of tube 17 in such manner that the tube wall is bulged radially outward over the entire area of contact between the collet fingers and the wall of the tube. This collet bulge is indicated by the reference character 39. The Allen wrench may be inserted into the end of the expander socket 27 by separation of the loose weave in the casing tube 17. The expander is then preferably tightened to the maximum extent possible by hand.

OPERATION

When the safety line is activated by the imposition of a live load applied to the hook 13 and cable 37, such as would occur if the person wearing the belt 14 fell from the window ledge, the suddenly imposed load will pull the cable 37 axially within the tube 17 and thereby cause the collet assembly to move axially within the tube and toward the stop constituted by the heretofore described constricted end of the tube. The resultant frictional drag of the expanded collet and the resistance encountered in forcing the bulk of its bulge to move along the tube begin immediately to absorb the kinetic energy of the falling load and thus decelerate the rate of fall progressively and increasingly as the bulge 39 of the expanded collet moves axially along the length of the tube. Due to the heretofore described "weave" of the strands comprising the fabric of the wall of the casing tube 17 the tube will be forced to elongate axially and thereby progressively reducing its diameter and constricting it tightly against the expanded collet fingers with a force that increases in proportion to the extent of axial travel of the collet in and along the tube. It is to be noted as an important feature of my invention that the decelerating braking force applied to the collet is directed radially inward as a force of compression, acting in the manner of a brake shoe applied against the outer face of a wheel rim.

The extent of axial travel of the collet assembly along the tube 17 under force applied by the imposition of a live load is a function of the setting to which the collet expander 24 is adjusted and also the magnitude of the applied load. Obviously, the greater the friction between the collet fingers and the wall of the tube 17 the slower will be the rate of travel of the collet assembly, so that full dissipation of the kinetic energy of the applied load may be achieved before the collet assembly travels the full length of the tube, in which event further extension of the cable 37 will cease and the fall of the load will stop. However, if the magnitude of the load is sufficient to overcome the maximum braking action of the shock absorber, further extension of the cable will be arrested when the collet assembly seats against the stop constituted by the reduced end of the tube, and the increasingly decelerating fall of the load will be stopped without injury to the person by whom the safety belt 14 is worn.

I claim:

1. A shock absorbing safety line comprising, in combination: a woven strand, flexible, tubular casing; attachment means on one end of the casing for connection to a fixed support; an expandible collet slidable axially within the casing; means for expanding the collet selectively into frictional engagement with the casing; a cable permanently connected to the collet and extending outwardly through the other end of the casing; attachment means on the free end of the cable for connection to a movable support; and stop means in the cable end of the casing engageable by the collet to prevent its exit from the casing.

2. In the safety line of claim 1; said woven casing having the property of simultaneous axial stretch and reduction in cross section when subjected to an axial pulling strain.

3. In the safety line of claim 2; said cable and stop means being in sliding frictional engagement.

4. In the safety line of claim 1; said stop means being a portion of the casing substantially reduced in cross section.

5. In the safety line of claim 4; means preventing disruption of the reduced portion of the casing by pressure from the collet when engaged thereby.

* * * * *